United States Patent
Song et al.

(10) Patent No.: US 11,863,094 B2
(45) Date of Patent: Jan. 2, 2024

(54) APPARATUS FOR CONTROLLING MOTOR AND METHOD FOR CONTROLLING MOTOR

(71) Applicant: LG ELECTRONICS INC., Seoul (KR)

(72) Inventors: Ha Min Song, Seoul (KR); Ki Wook Lee, Seoul (KR); Kwang Sik Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 142 days.

(21) Appl. No.: 17/547,663

(22) Filed: Dec. 10, 2021

(65) Prior Publication Data

US 2022/0190768 A1 Jun. 16, 2022

(30) Foreign Application Priority Data

Dec. 14, 2020 (KR) .......................... 10-2020-0174207

(51) Int. Cl.
*H02P 27/06* (2006.01)
*H02P 21/18* (2016.01)

(52) U.S. Cl.
CPC .............. *H02P 27/06* (2013.01); *H02P 21/18* (2016.02)

(58) Field of Classification Search
CPC .................................. H02P 27/06; H02P 21/18
See application file for complete search history.

(56) References Cited

U.S. PATENT DOCUMENTS

| | | | |
|---|---|---|---|
| 9,420,279 B2 | 8/2016 | Jang et al. | |
| 2009/0039813 A1* | 2/2009 | Yamada | H02P 29/68 318/434 |
| 2014/0300309 A1* | 10/2014 | Yoo | H02P 21/18 318/801 |
| 2018/0287526 A1* | 10/2018 | Iwaji | H02P 6/21 |
| 2020/0195181 A1* | 6/2020 | Yoshikawa | G03G 15/5008 |
| 2021/0351728 A1* | 11/2021 | Pollock | G01R 15/181 |

FOREIGN PATENT DOCUMENTS

KR 10-2013-0135659 12/2013

* cited by examiner

*Primary Examiner* — Zoheb S Imtiaz
(74) *Attorney, Agent, or Firm* — KED & ASSOCIATES, LLP (57) ABSTRACT

Disclosed is a motor control apparatus and a motor control method to estimate a stator resistance of a motor for sensorless control of the motor.

16 Claims, 10 Drawing Sheets

APPARATUS FOR CONTROLLING MOTOR AND METHOD FOR CONTROLLING MOTOR

CROSS-REFERENCE TO RELATED APPLICATION

This application claims the benefit of Korean Patent Application No. 10-2020-0174207, filed in Korea on Dec. 14, 2020, in the Korean Intellectual Property Office, the disclosure of which is incorporated herein in its entirety by reference.

BACKGROUND

1. Field

The present disclosure relates to a motor control method and a motor control apparatus for estimating a stator resistance of a motor for a sensorless control of the motor.

2. Background

According to an operation principle for motors used in home appliances, current may be controlled only when exact positions of rotors are identified. In order to obtain position information, encoders, resolvers, hall sensors, and the like may be used, but such position detection devices are generally expensive, and have complicating wirings and structures such that usage environment thereof is limited. Accordingly, in recent years, sensorless control that does not use position detection devices has been actively studied, but the sensorless control has a problem of initial position detection. When an initial position of a motor (rotor) is not correct, a starting torque becomes smaller and a rotation direction of the motor may reverse, which may cause a danger.

Meanwhile, in the related art sensorless control of a motor of a washing machine, an initial position alignment may be carried out to stabilize initial starting characteristics and detection performance. This means that a specific current is applied to the stator of the motor so that the position of the rotor of the motor is aligned. Korean Patent Application No. 10-2013-0135659 discloses a method of performing initial position alignment.

However, when the initial position alignment of a rotor of a motor is performed as in the related art described above, each time starting the motor, a time for aligning the position is required, and as the inertia of an object to be driven by the motor increases, the time taken to align the position becomes even longer. Thus, a net acting ratio of a washing machine may be lowered.

Accordingly, research on a technique for controlling a motor to start after estimating an initial position instead of performing initial position alignment while performing sensorless control of the motor of a washing machine is in progress.

BRIEF DESCRIPTION OF THE DRAWINGS

Arrangements and embodiments may be described in detail with reference to the following drawings in which like reference numerals refer to like elements and wherein.

DETAILED DESCRIPTION

Hereinafter, example embodiments of the present disclosure will be described in detail with reference to the attached drawings to allow those skilled in the art to easily execute the same. The present disclosure may, however, be implemented in many different forms and should not be construed as being limited to the example embodiments described herein. In addition, parts irrelevant to the description will be omitted in the drawings in order to clearly explain the present disclosure. Similar parts are denoted by similar reference numerals throughout the specification.

Throughout the specification, when one part is referred to as being "connected" to another part, it should be understood that the former may be "directly connected" to the latter or "electrically connected" to the latter via an intervening part. Further, when a part is referred to as "including" a component, this means that the part may include another component, and does not exclude another component unless specifically stated otherwise.

Figure 1:
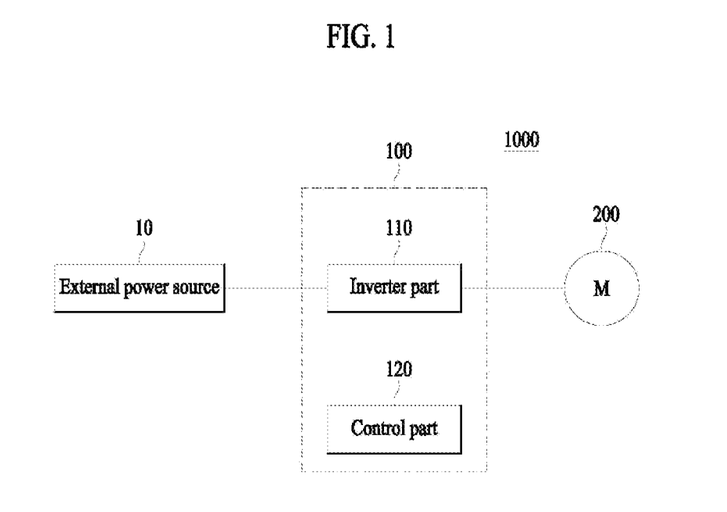
FIG. 1 is a diagram illustrating a configuration of a motor control system including a motor control apparatus according to the present disclosure.

FIG. 1 is a diagram illustrating a configuration of a motor control system including a motor control apparatus according to the present disclosure.

A control apparatus 100 of FIG. 1 is an apparatus for controlling an operation of a motor 200 in a motor control system 1000 configured to control the driving of the motor 200.

The motor 200 whose operation is controlled by the control apparatus 100 refers to a three-phase motor having a stator and a rotor, and alternating current (AC) power of a predetermined frequency is applied to a coil of the stator of each phase of three phases so that the rotor rotates.

For example, the motor may be one of a surface-mounted permanent magnet synchronous motor (SMPMSM), an interior permanent magnet synchronous motor (IPMSM), and a synchronous reluctance motor (Synrm).

The motor control apparatus 100 may be an apparatus for controlling the driving of the motor 200 by supplying driving power to the motor 200. In addition, the control apparatus 100 may be an apparatus for controlling the operation of the motor 200 to control the driving of a compressor including the motor 200.

The control apparatus 100 may be an apparatus for controlling the motor 200 using an inverter method. That is, the control apparatus 100 may be an inverter for controlling the driving of the motor 200, or an apparatus including the inverter.

The control apparatus 100 may control the operation of the motor 200 by controlling the inverter in relation to the driving of the motor 200.

Meanwhile, the control apparatus 100 may be an apparatus for controlling the operation of the motor 200 using a sensorless method.

As shown in FIG. 1, the control apparatus 100 includes an inverter part 110 configured to convert direct current (DC) power into AC power and output the AC power to the motor 200, and a control part 120 configured to control the inverter part 110 in relation to the driving of the motor 200.

In the control apparatus 100 including the inverter part 110 and the control part 120, the control part 120 controls the inverter part 110 such that a first input voltage for estimating resistance of the stator of the motor 200 is applied before a second input voltage for estimating a position of the rotor of the motor 200, in response to a start-up of the driving of the motor 200.

Further, the control part 120 controls the driving of the motor 200 on the basis of the resistance of the stator estimated according to the result of applying the first input voltage.

Here, the first input voltage may include a third input voltage and a fourth input voltage. In this case, a maximum value of the third input voltage and a maximum value of the fourth input voltage may be different, and angles of composite magnetic fluxes of the motor generated due to the third input voltage and the fourth input voltage may be the same.

Further, the control part 120 may control the inverter part 110 to apply the fourth input voltage when a time which exceeds a first threshold time has passed from a point at which a response current for the third input voltage is 0 [A].

Meanwhile, a resistance value of the stator may be estimated in a section in which the response current for each of the third input voltage and the fourth input voltage is less than 0 [A].

Meanwhile, the third input voltage and the fourth input voltage may each have a sine wave form.

Further, the control part 120 may control the inverter part 110 not to apply the first input voltage before a time which exceeds a second threshold time has passed after receiving a stop command from the motor 200.

Meanwhile, the resistance value of the stator may be newly estimated when the time which exceeds the second threshold time has passed after receiving the stop command of the motor 200.

Further, the resistance value of the stator may not be updated even when the first input voltage is applied before the time which exceeds the second threshold time has passed after receiving the stop command of the motor 200.

Meanwhile, the first input voltage may be a voltage in which a compensation voltage is added to a command voltage in order to correct an error between the command voltage and a voltage output to the motor 200.

At this time, when the inverter part 110 includes a plurality of inverters, the compensation voltage may be changed according to a sum of voltage errors when power is applied to the plurality of inverters.

That is, when the motor 200 starts operating, the control apparatus 100 estimates the position of the rotor after estimating the resistance of the stator without aligning the position of the rotor of the motor 200.

As such, since the position of the rotor is not aligned before the motor 200 starts operating, a time taken to align the position of the rotor may be reduced.

In addition, a signal for estimating the resistance of the stator and a signal for estimating the position of the rotor are separated, and the signal for estimating the resistance is applied before the signal for estimating the position, so that the accuracy of the resistance estimation may be improved. That is, since the resistance of the stator is estimated before estimating the position of the rotor, an influence due to the signal for estimating the position may be minimized.

FIGS. 2A and 2B are diagrams illustrating an example of a current applied in response to a start-up of driving of a motor in the related art.

Figure 2:
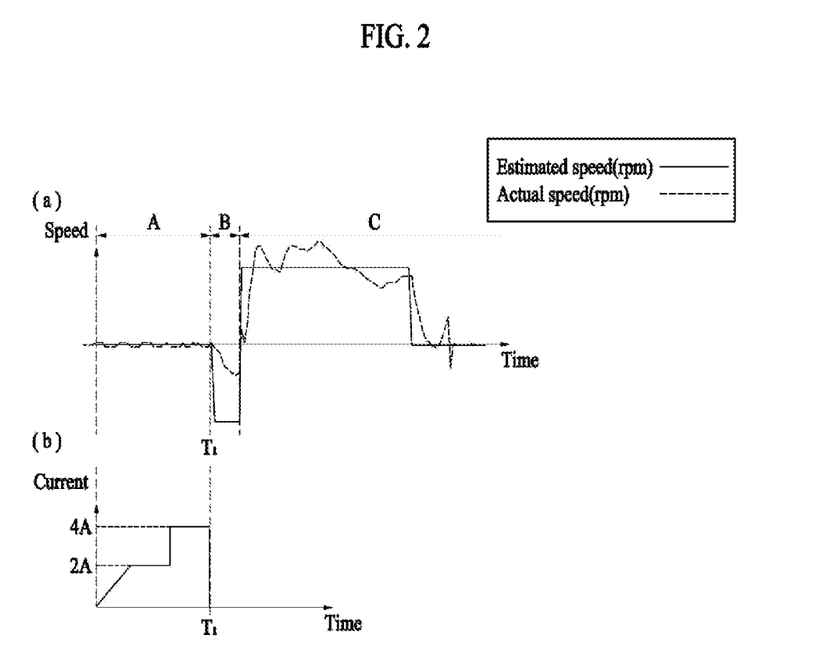
FIGS. 2A and 2B are diagrams illustrating an example of a current applied in response to a start-up of driving of a motor in the related art.

In the related art sensorless control of a motor of a washing machine, an initial position alignment may be carried out to stabilize initial starting characteristics and detection performance. In the initial position alignment operation, as shown in FIG. 2, a DC is applied to align a position of the motor to a specific position, and then the motor is driven, and by using voltage and current information at this time, a stator resistance $R_S$, which is an essential parameter for sensorless control, is detected.

Referring to FIGS. 2A and 2B, section A may be a section in which the position alignment of the rotor is carried out, and section B may be a section in which swing start-up of the motor is carried out. In addition, the starting of the motor may begin from section C. Referring to FIG. 2A, it can be seen that, in section A, a motor speed is close to zero because it is before starting the motor, but when it reaches section C after passing section B, the motor speed increases.

Meanwhile, the current applied to the motor control apparatus in section A may be the same as that shown in FIG. 2B. In the related art, the resistance of the stator was simultaneously estimated while aligning the position of the rotor. However, there is a problem in that a time (0 to Ti) taken to align the position is relatively long, and the greater the inertia of an object to be driven by the motor, the longer the time taken to align the position.

FIGS. 3A and 3B are diagrams illustrating an example of a current applied in response to a start-up of driving of a motor according to the present disclosure.

The motor control apparatus and method according to an example embodiment of the present disclosure may estimate the resistance of the stator and estimate the position of the rotor instead of performing a process of aligning the position of the rotor. Thus, the motor control apparatus may estimate the resistance of the stator and the position of the rotor in section A' shown in FIG. 3A instead of section A shown in FIG. 2A.

Figure 3:
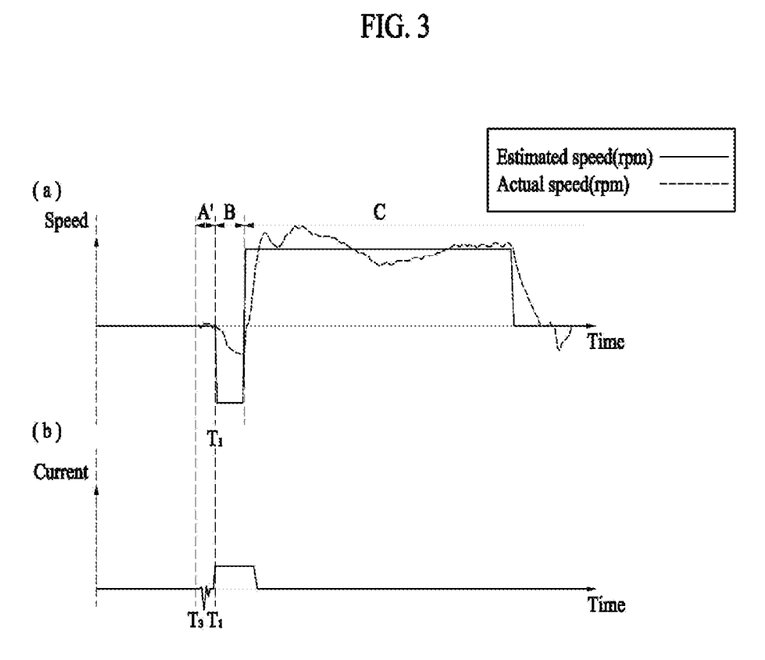
FIGS. 3A and 3B are diagrams illustrating an example of a current applied in response to a start-up of driving of a motor according to the present disclosure.

At this time, a current applied to the motor control apparatus and system from section A' to section C may be the same as that shown in FIG. 3B. Referring to FIGS. 2A through 3B, it can be seen that a time (section A') taken to estimate the resistance of the stator and the position of the rotor is shorter than a time (section A) taken to align the position of the rotor. Accordingly, the motor control apparatus and method according to an example embodiment of the present disclosure may reduce noise and/or vibration of the motor.

Figure 4:
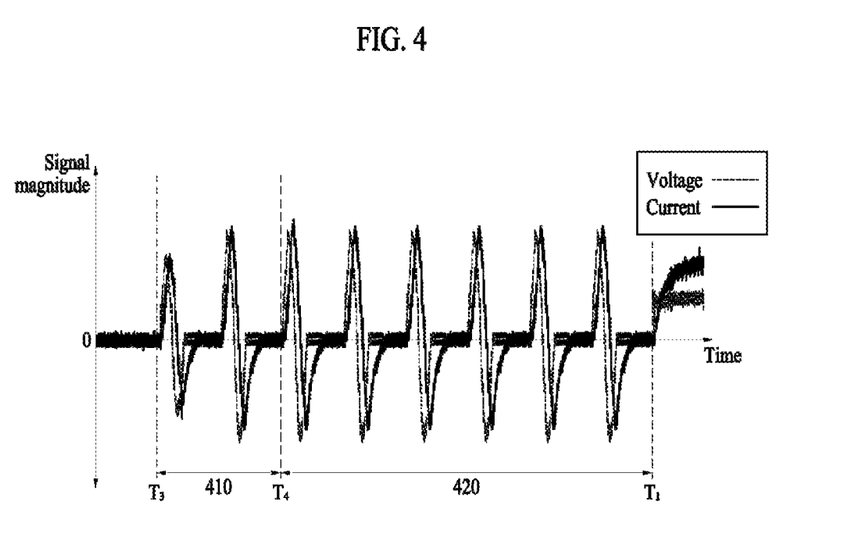
FIG. 4 is a diagram illustrating an example of a resistance estimation section and an initial position estimation section according to an example embodiment of the present disclosure.

FIG. 4 is a diagram illustrating an example of a resistance estimation section and an initial position estimation section according to an example embodiment of the present disclosure.

Referring to FIG. 4, in a motor control apparatus and method according to an example embodiment of the present disclosure, an inverter part may be controlled such that a first input voltage 410 for estimating resistance and a second pattern voltage 420 for estimating an initial position are applied in response to a start-up of the driving of the motor.

Meanwhile, when a signal for estimating the resistance and a signal for estimating the initial position are applied, rotational torque is generated by the signals so that the motor may be moved. This movement of the motor may affect the performance of estimating the resistance.

When this is taken into consideration, the first input voltage 410 of the present disclosure may be applied before the second pattern voltage 420 is applied. Accordingly, the motor control apparatus and method according to an example embodiment of the present disclosure may prevent the performance of estimating the resistance from being degraded due to the second pattern voltage 420.

Further, in order to offset a voltage error due to non-linearity of the inverter, the first input voltage 410 may be applied to the same position of the rotor. Whether the first input voltage is applied to the same position of the rotor is detected by detecting an angle of a composite magnetic flux of the motor due to the first input voltage.

For example, the first input voltage 410 may be applied at 0°, but the position at which the first input voltage 410 is applied is not limited thereto.

Figure 5:
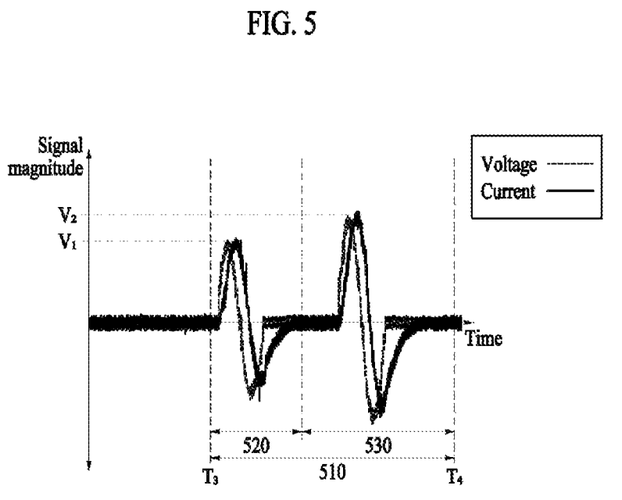
FIG. 5 is a diagram illustrating an example of a resistance estimation section according to another example embodiment of the present disclosure.

FIG. 5 is a diagram illustrating an example of a resistance estimation section according to another example embodiment of the present disclosure.

Referring to FIG. 5, a first input voltage 510 for estimating resistance may include a third input voltage 520 having a maximum value of $V_1$ and a fourth input voltage 730 having a maximum value of $V_2$. For example, $V_1$ may be $0.75*V_2$, but the relationship between $V_1$ and $V_2$ is not limited thereto.

In other words, the first input voltage 510 may include the third input voltage 520 and the fourth input voltage 530 having different amplitudes. However, the shape of the first input voltage 510 is not limited thereto, and the first input voltage 510 may be at least one of a square wave, a half wave, a pulse, and a sine wave.

Figure 6:
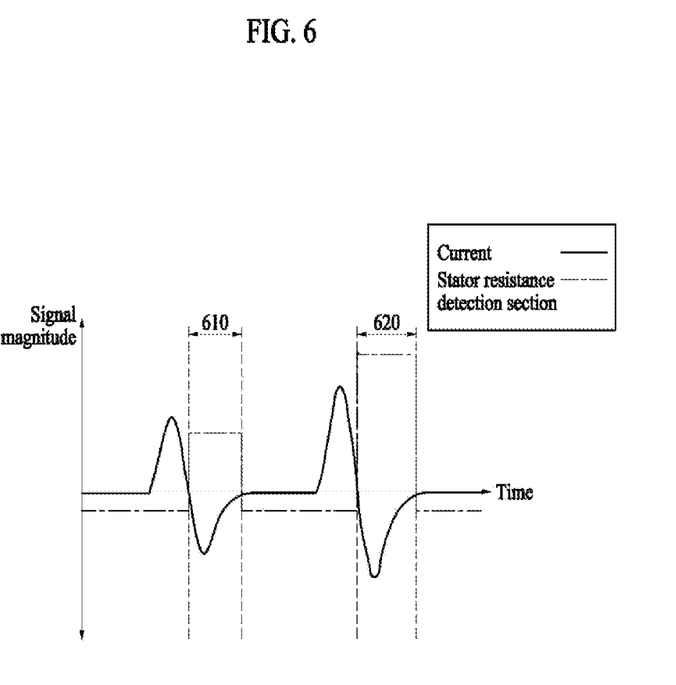
FIG. 6 is a diagram illustrating an example of a resistance detection section included in the resistance estimation section according to an example embodiment of the present disclosure.

FIG. 6 is a diagram illustrating an example of a resistance detection section included in the resistance estimation section according to an example embodiment of the present disclosure.

When the first input voltage includes a third input voltage and a fourth input voltage, a first detection section 610 of FIG. 6 indicates a section in which a response current for the third input voltage is less than 0 [A]. In addition, a second detection section 620 indicates a section in which a response current for the fourth input voltage is less than 0 [A].

The motor control apparatus and method according to an example embodiment may estimate the resistance of the stator in the first detection section 610 and the second detection section 620.

Meanwhile, a stator resistance $R_S$ may be calculated on the basis of Equations 1 to 4 below. First, a motor voltage equation based on a stationary coordinate system is given by Equation 1.

$$V_\alpha = R_s I_\alpha + L_s \frac{dI_\alpha}{dt} - \omega_{re} \phi_f \sin\theta_{re} \qquad \text{[Equation 1]}$$

Here, $L_S$ denotes a stator inductance. Meanwhile, assuming that $\omega_{re}=0$, integral values for voltages detected in the first detection section 610 and the second detection section 620 may be respectively expressed as Equations 2 and 3.

$$\int V_{\alpha 1} dt = R_s \int I_{\alpha 1} dt + L_s \int \frac{dI_{\alpha 1}}{dt} dt \qquad \text{[Equation 2]}$$

Here, $V_{\alpha 1}$ denotes a voltage detected in the first detection section 610, and $I_{\alpha 1}$ denotes a current detected in the first detection section 610.

$$\int V_{\alpha 2} dt = R_s \int I_{\alpha 2} dt + L_s \int \frac{dI_{\alpha 2}}{dt} dt \qquad \text{[Equation 3]}$$

Here, $V_{\alpha 2}$ denotes a voltage detected in the second detection section 620, and $I_{\alpha 2}$ denotes a current detected in the second detection section 620. Accordingly, using Equations 2 and 3, the stator resistance $R_S$ may be calculated as Equation 4.

$$R_s = \frac{\left(\left(\int V_{\alpha 2} - \int V_{\alpha 1}\right) - L_s(I_{\alpha 2} - I_{\alpha 1})\right)}{\left(\int I_{\alpha 2} - \int I_{\alpha 1}\right)} \qquad \text{[Equation 4]}$$

Figure 7:
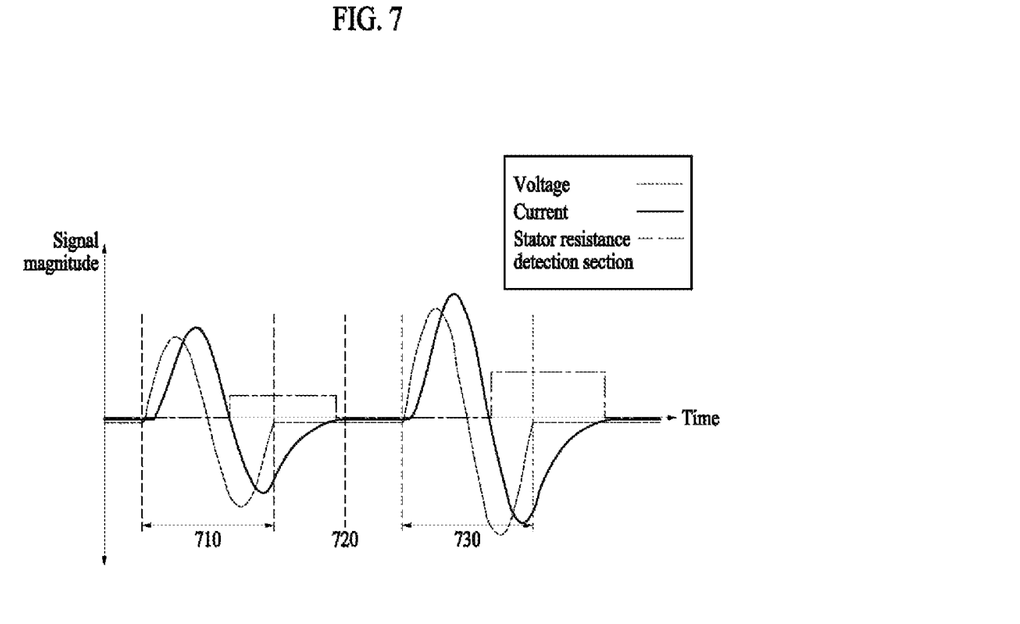
FIG. 7 is a diagram for describing a method of estimating a stator resistance according to an example embodiment of the present disclosure.

FIG. 7 is a diagram for describing a method of estimating a stator resistance according to an example embodiment of the present disclosure.

Referring to FIG. 7, the motor control apparatus and method according to an example embodiment of the present disclosure may control a switching operation such that a fourth input voltage is applied when a time which exceeds a first threshold time has passed from a point at which a response current for a third input voltage is 0 [A] after the third input voltage has applied.

Referring to FIG. 7, when a third input voltage 710 is applied, a response current for the third input voltage 710 may be detected. In the motor control apparatus and method according to an example embodiment, a fourth input voltage 730 may be applied when a time which exceeds the first threshold time has passed from a point 720 at which the response current for the third input voltage 710 is 0 [A]. For example, the first threshold time may be 15 ms, but the first threshold time is not limited thereto.

When the motor moves while the resistance is estimated, a voltage due to a counter electromotive force may be generated so that a resistance estimation error may occur. Thus, when starting the motor in a state in which the motor is not completely stopped, a signal for estimating resistance may not be applied, or a resistance value may not be newly detected even when the signal for estimating the resistance is applied.

Here, the expression "the resistance value is not newly detected" may include that a previously estimated resistance value is not updated by a new resistance value even when the resistance value is newly estimated. For example, although it depends on a load amount and quantity, when a time period from a motor stop command to a motor start command is within 3.5 seconds, the resistance value may not be updated. In addition, the resistance value of the stator may not be detected or updated in a motion in which the motor starts immediately after stopping, such as a short circuit after detecting eccentricity, or cloth wetting pattern, in addition to a motion that controls the operation of the motor with a net acting ratio, such as washing or tumbling. Accordingly, the motor control apparatus and method according to an example embodiment may reduce a resistance error.

Figure 8:
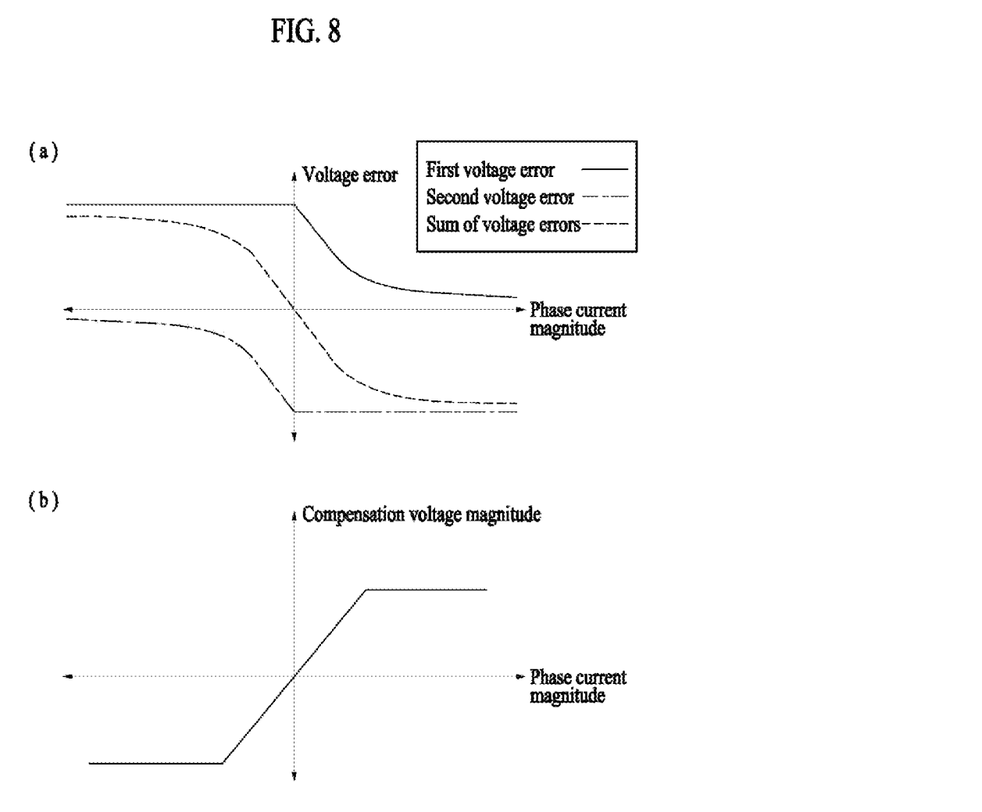
FIGS. 8A and 8B are diagrams for describing non-linear characteristics of an inverter and a compensation voltage according to the non-linear characteristics of the inverter.

FIGS. 8A and 8B are diagrams for describing non-linear characteristics of the inverter and a compensation voltage according to the non-linear characteristics of the inverter.

In the motor control apparatus and method according to an example embodiment of the present disclosure, a first input voltage obtained by adding a compensation voltage to a command voltage may be applied to compensate for non-linearity of the inverter included in the inverter part.

When a voltage for estimating resistance is applied, non-linear characteristics of the inverter due to dead time or the like in a low voltage region may be present. Accordingly, in order to reduce an influence of the non-linear characteristics of the inverter, a voltage error occurring at the dead time may be calculated and may be added to the command voltage. As such, the voltage added to the command voltage may be defined as a compensation voltage.

Referring to FIG. 8A, a first voltage error represents a voltage error when power is applied to a lower inverter of the motor, and a second voltage error represents a voltage error when power is applied to an upper inverter of the motor. It can be seen that the voltage error occurs in a section except for a point at which a magnitude of a phase current is 0 [A] when the first voltage error and the second voltage error are summed.

FIG. 8B illustrates a compensation voltage determined in consideration of the sum of the voltage errors shown in FIG. 8A. Referring to FIGS. 8A and 8B, it can be seen that the compensation voltage has a sign opposite to that of the voltage error.

Figure 9:
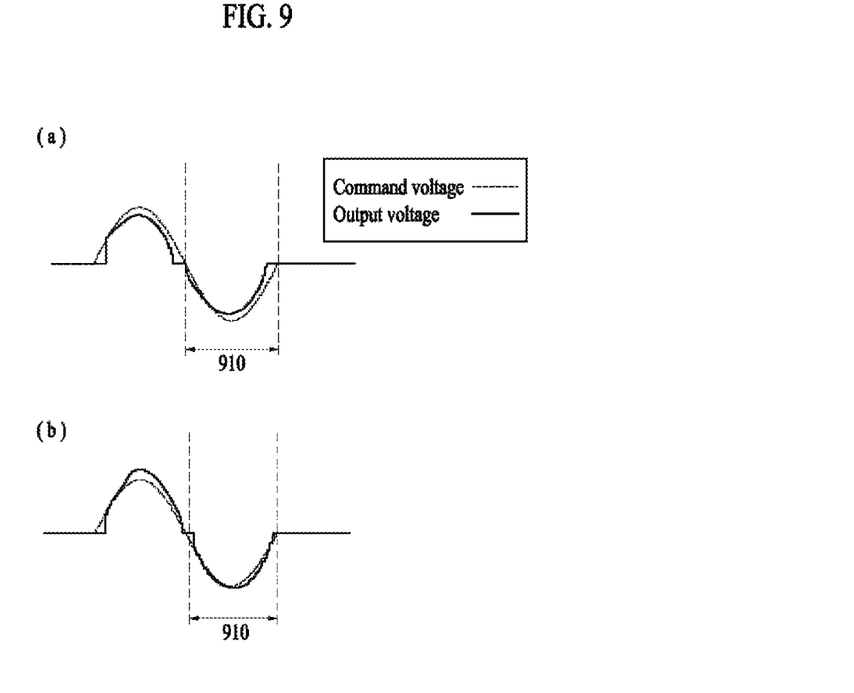
FIGS. 9A and 9B are diagrams for describing a difference between a command voltage according to a compensation voltage and a voltage output to the motor, according to an example embodiment.

FIGS. 9A and 9B are diagrams for describing a difference between a command voltage according to the compensation voltage and a voltage output to the motor, according to an example embodiment.

Meanwhile, the motor control apparatus and method according to an example embodiment of the present disclosure may estimate the resistance of the stator in a detection section in which the response current for the first input voltage is less than 0 [A]. Meanwhile, the first detection section is highly likely to be similar to a first section 910 of FIGS. 9A and 9B, and thus in the description of FIGS. 9A and 9B, it is assumed that the motor control apparatus and method of the present disclosure estimate the resistance of the stator in the first section 910.

Meanwhile, FIG. 9A is a diagram illustrating the command voltage and an output voltage, which is a voltage output to the motor before the non-linearity of the inverter is compensated for. It can be seen that a difference occurs between the command voltage and the output voltage in the first section 910 because the compensation voltage is not considered.

Meanwhile, after the compensation voltage is added to the command voltage to compensate for the non-linearity of the inverter, the output voltage may be the same as that in FIG. 9B. Referring to FIG. 9B, it can be seen that the command voltage and the output voltage are substantially similar to each other in the first section 910.

Figure 10:
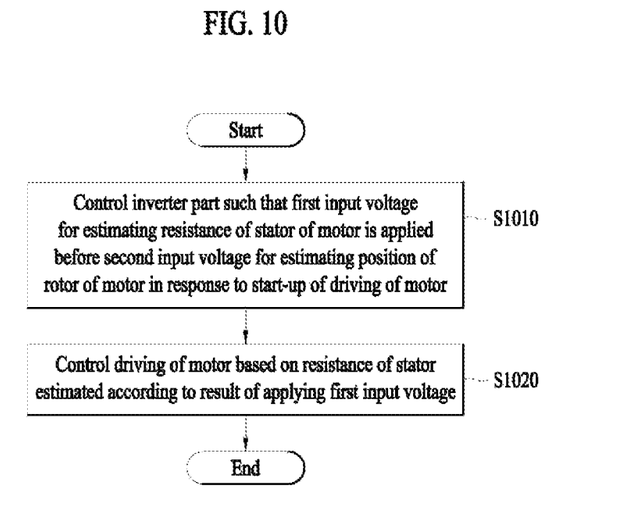
FIG. 10 is a flowchart illustrating a motor control method according to another example embodiment of the present disclosure.

FIG. 10 is a flowchart illustrating a motor control method according to another example embodiment of the present disclosure.

In operation S1010, the present disclosure may control the inverter part such that a first input voltage for estimating resistance of the stator of the motor is applied before a second input voltage for estimating a position of the rotor of the motor in response to a start-up of the driving of the motor.

Here, the first input voltage may include a third input voltage and a fourth input voltage. In this case, a maximum value of the third input voltage and a maximum value of the fourth input voltage may be different, and angles of composite magnetic fluxes of the motor generated due to the third input voltage and the fourth input voltage may be the same.

Meanwhile, the third input voltage and the fourth input voltage may each have a sine wave form.

Operation S1010 may include controlling the inverter part to apply the fourth input voltage when a time which exceeds a first threshold time has passed from a point at which a response current for the third input voltage is 0 [A].

Further, operation S1010 may include controlling the inverter part not to apply the first input voltage before a time which exceeds a second threshold time has passed after receiving a stop command from the motor.

In operation S1020, the present disclosure may control the driving of the motor on the basis of the resistance of the stator estimated according to the result of applying the first input voltage.

Meanwhile, a resistance value of the stator may be estimated in a section in which the response current for each of the third input voltage and the fourth input voltage is less than 0 [A].

Further, the resistance value of the stator may be newly estimated when the time which exceeds the second threshold time has passed after receiving the stop command of the motor.

Further, the resistance value of the stator may not be updated even when the first input voltage is applied before the time which exceeds the second threshold time has passed after receiving the stop command of the motor.

Meanwhile, the first input voltage may be a voltage in which a compensation voltage is added to a command voltage in order to correct an error between the command voltage and a voltage output to the motor.

Here, when the inverter part includes a plurality of inverters, the compensation voltage may be a voltage that is changed according to a sum of voltage errors when power is applied to the plurality of inverters.

The above-described example embodiments of the motor control apparatus, the motor control system, and the motor control method according to the present disclosure may be applied to and implemented on a motor control apparatus provided in a motor, for example, an inverter apparatus for controlling the motor, a motor including the same, a control method for the motor, or the like. In particular, the example embodiments may be effectively applied to and implemented on a control apparatus, a control system, and a control method for controlling an initial operation of a motor, a control apparatus, a control system, and a control method for aligning a position of a motor, a control apparatus, a control system, a control method for detecting a position of a motor, or the like. In addition, the example embodiments may also be effectively applied to and implemented on a compressor control apparatus provided in a compressor including a motor, for example, an inverter apparatus for controlling a motor of a compressor, a compressor including the same, a control method for the compressor, or the like. However, techniques disclosed herein are not limited thereto, and may also be applied to and implemented on all motor control apparatuses, motor control systems and motor control methods, home appliances including the motor, control apparatuses for home appliances including the motor, and control systems and control methods for home appliances including the motor to which the technical concept of the present disclosure is applicable.

Further, in the present specification, the terms "er (or) etc." may be a hardware component, such as a processor or circuit, and/or a software component executed by the hardware configuration, such as a processor.

An aspect provides a motor control apparatus, a motor control system, and a motor control method for estimating resistance of a stator before starting a motor. The technical goals to be achieved by the present example embodiments are not limited to the above-described technical aspects, and other technical aspects which are not described may be inferred from the following example embodiments.

According to an aspect, there is provided a motor control apparatus including an inverter part configured to convert direct current (DC) power into alternating current (AC) power and output the AC power to a motor, and a control part configured to control the inverter part in relation to driving of the motor, and the control part may control the inverter part such that a first input voltage for estimating resistance of a stator of the motor is applied before a second input voltage for estimating a position of a rotor of the motor in response to a start-up of the driving of the motor, and control the driving of the motor on the basis of the resistance of the stator estimated according to a result of applying the first input voltage.

According to another aspect, there is also provided a motor control method of a motor control apparatus including an inverter part configured to convert direct current (DC) power into alternating current (AC) power and output the AC power to a motor and a control part configured to control the inverter part in relation to driving of the motor, the method including controlling the inverter part such that a first input voltage for estimating resistance of a stator of the motor is applied before a second input voltage for estimating a position of a rotor of the motor in response to a start-up of the driving of the motor, and controlling the driving of the motor on the basis of the resistance of the stator estimated according to a result of applying the first input voltage.

Specific details of other example embodiments are included in the detailed descriptions and drawings.

According to an example embodiment of the present disclosure, one or more of the following effects can be achieved.

First, a time for aligning an initial position of a motor can be omitted so that it is possible to drive the motor more rapidly.

Second, the accuracy of detecting resistance of a stator of the motor can be improved so that it is possible to control the operation of the motor accurately and stably.

Effects of the present disclosure will not be limited to the above-mentioned effects and other unmentioned effects will be clearly understood by those skilled in the art from the following claims.

The above description of the present disclosure is only exemplary, and it will be understood by those skilled in the art that various modifications may be made without departing from the scope of the present disclosure and without changing essential features. Therefore, the example embodiments described above should be understood as being illustrative in all aspects instead of limiting. For example, each component described as a single entity may be distributed and implemented, and components described as being distributed may also be implemented in a combined form.

The scope of the present disclosure will be defined by the following claims rather than the above detailed description, and all changes and modifications derived from the meaning and the scope of the claims and equivalents thereof should be understood as being included in the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor control apparatus comprising: an inverter configured to convert direct current (DC) power into alternating current (AC) power, and to output the AC power to a motor; and a controller configured to control the inverter in relation to driving the motor, wherein the controller is configured to: control the inverter to apply a first input voltage for estimating resistance of a stator of the motor before applying a second input voltage for estimating a position of a rotor of the motor, in response to a start-up of the driving of the motor, and control the driving of the motor based on the estimated resistance of the stator according to a result of applying the first input voltage, wherein: the first input voltage includes a third input voltage and a fourth input voltage, a maximum value of the third input voltage is different than a maximum value of the fourth input voltage, and angles of composite magnetic fluxes of the motor generated due to the third input voltage and the fourth input voltage are the same and wherein the controller is configured to control the inverter to apply the fourth input voltage when a time, which exceeds a threshold time, has passed from a point at which a response current of the third input voltage is 0 amperes.

2. The motor control apparatus of claim 1, wherein the controller is configured to estimate the resistance of the stator based on a section of a response current, for each of the third input voltage and the fourth input voltage, being less than 0 amperes.

3. The motor control apparatus of claim 1, wherein the controller is configured to control the inverter to apply the third input voltage in a sine wave form, and the controller is configured to control the inverter to apply the fourth input voltage in a sine wave form.

4. The motor control apparatus of claim 1, wherein the controller is configured to control the inverter to not apply the first input voltage before a time, which exceeds a threshold time, has passed after receiving a stop command from the motor.

5. The motor control apparatus of claim 1, wherein the controller is configured to newly estimate the resistance of the stator when a time, which exceeds a threshold time, has passed after receiving a stop command of the motor.

6. The motor control apparatus of claim 1, wherein the controller is configured to not update the resistance of the stator when the first input voltage is applied before a time, which exceeds a threshold time, has passed after receiving a stop command of the motor.

7. The motor control apparatus of claim 1, wherein the first input voltage is based on a compensation voltage being added to a command voltage in order to correct an error between the command voltage and a voltage output to the motor.

8. The motor control apparatus of claim 7, wherein when the inverter includes a plurality of inverters, the compensation voltage is a voltage that is changed based on a sum of voltage errors occurring when power is applied to the plurality of inverters.

9. A method of controlling an inverter for driving a motor, the method comprising: controlling the inverter to apply a first input voltage for estimating resistance of a stator of the motor before applying a second input voltage for estimating a position of a rotor of the motor, in response to a start-up of driving of the motor; and controlling the driving of the motor based on the estimated resistance of the stator according to a result of applying the first input voltage, wherein the first input voltage includes a third input voltage and a fourth input voltage, a maximum value of the third input voltage is different than a maximum value of the fourth input voltage, and angles of composite magnetic fluxes of the motor generated due to the third input voltage and the fourth input voltage are the same and wherein the controlling of the inverter includes controlling the inverter to apply the fourth input voltage when a time, which exceeds a threshold time, has passed from a point at which a response current of the third input voltage is 0 amperes.

10. The method of claim 9, wherein the estimation of the resistance of the stator is based on a section of a response current, for each of the third input voltage and the fourth input voltage, being less than 0 amperes.

11. The method of claim 9, wherein the third input voltage is applied in a sine wave form, and the fourth input voltage is applied in a sine wave form.

12. The method of claim 9, wherein the controlling of the inverter includes controlling the inverter to not apply the first input voltage before a time, which exceeds a threshold time, has passed after receiving a stop command from the motor.

13. The method of claim 9, wherein the resistance of the stator is newly estimated when a time, which exceeds a threshold time, has passed after receiving a stop command of the motor.

14. The method of claim 9, wherein a resistance of the stator is not updated when the first input voltage is applied before a time, which exceeds a threshold time, has passed after receiving a stop command of the motor.

15. The method of claim 9, wherein the first input voltage is based on a compensation voltage being added to a command voltage in order to correct an error between the command voltage and a voltage output to the motor.

16. The method of claim 15, wherein when the inverter includes a plurality of inverters, the compensation voltage is a voltage that is changed based on a sum of voltage errors occurring when power is applied to the plurality of inverters.

* * * * *